United States Patent [19]

Goade et al.

[11] Patent Number: 5,383,391
[45] Date of Patent: Jan. 24, 1995

[54] CRADLE BEARING ARRANGEMENT FOR AXIAL PISTON HYDRAULIC DEVICES

[75] Inventors: James C. Goade, Morris; Claude H. Werner, Manhattan, both of Ill.

[73] Assignee: Caterpillar Inc., Peoria, Ill.

[21] Appl. No.: 210,487

[22] Filed: Mar. 21, 1994

[51] Int. Cl.$^6$ .................. F01B 3/00; F16H 23/00
[52] U.S. Cl. ............................ 92/12.2; 92/57; 91/505; 91/499; 74/60
[58] Field of Search ............... 92/12.2, 57, 71; 417/222.1; 91/499, 504, 505; 74/60

[56] References Cited

U.S. PATENT DOCUMENTS

| | | | |
|---|---|---|---|
| 3,465,680 | 9/1969 | Saila | 91/505 |
| 4,029,367 | 6/1977 | Schwede et al. | 91/505 |
| 4,627,330 | 12/1986 | Beck, Jr. | 92/12.2 |
| 4,858,480 | 8/1989 | Rohde et al. | 417/222.1 |
| 4,896,583 | 1/1990 | Lemke | 91/505 |
| 5,017,095 | 5/1991 | Burgess et al. | 417/222.1 |
| 5,024,143 | 6/1991 | Schniederjan | 92/57 |

*Primary Examiner*—Thomas E. Denion
*Attorney, Agent, or Firm*—John W. Grant

[57] ABSTRACT

Arcuate bearings are useful, for example, in pivotally supporting a cradle swashplate of axial piston variable displacement hydraulic devices. The bearings of known hydraulic devices have either been a pair of laterally spaced roller bearings assembly or a pair of laterally spaced sleeve bearings. The subject hydraulic device includes a roller bearing assembly positioned between the swashplate and the housing at the side of the swashplate subjected to high loads and a less expensive sleeve bearing positioned between the swashplate and the housing at the other side of the swashplate subjected to low loads. By using this combination of bearings, the overall cost of the hydraulic device is reduced without impairing the operation of the hydraulic device.

4 Claims, 3 Drawing Sheets

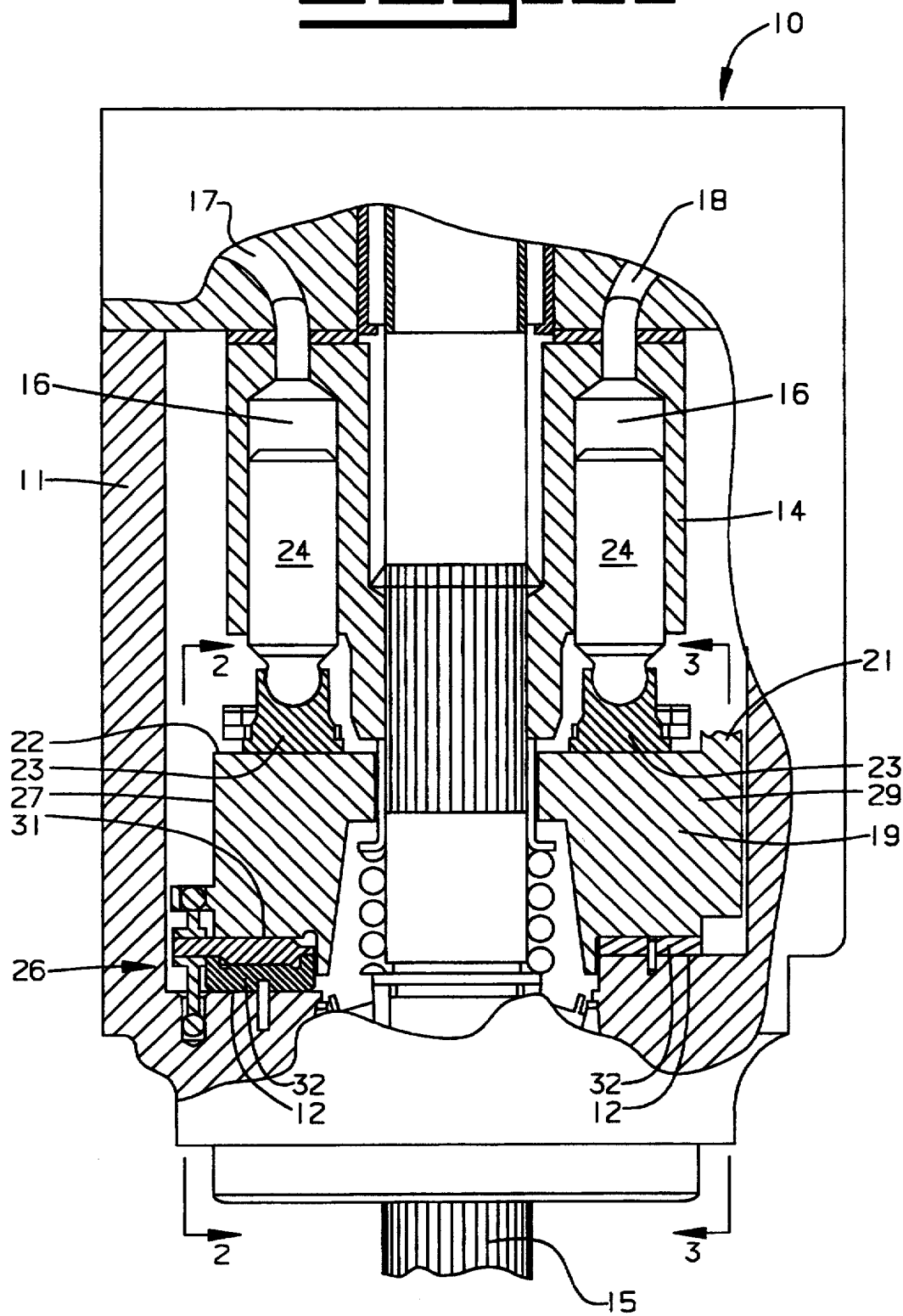

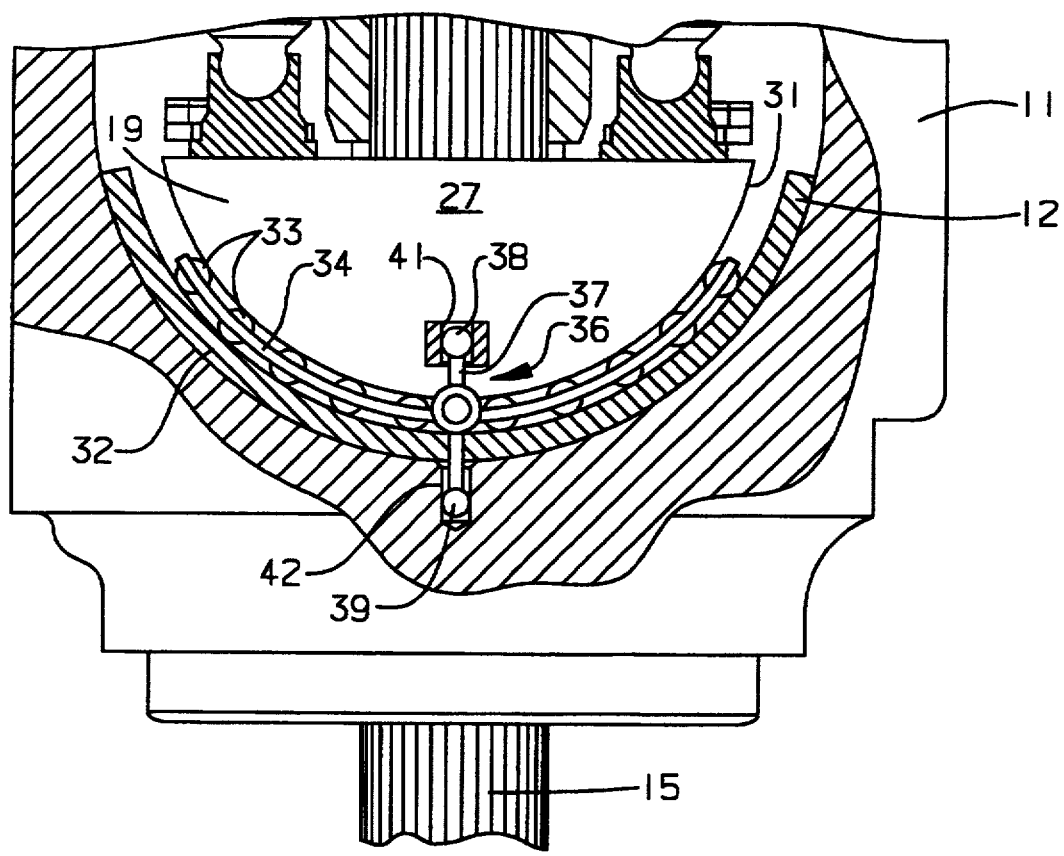
Fig_2_

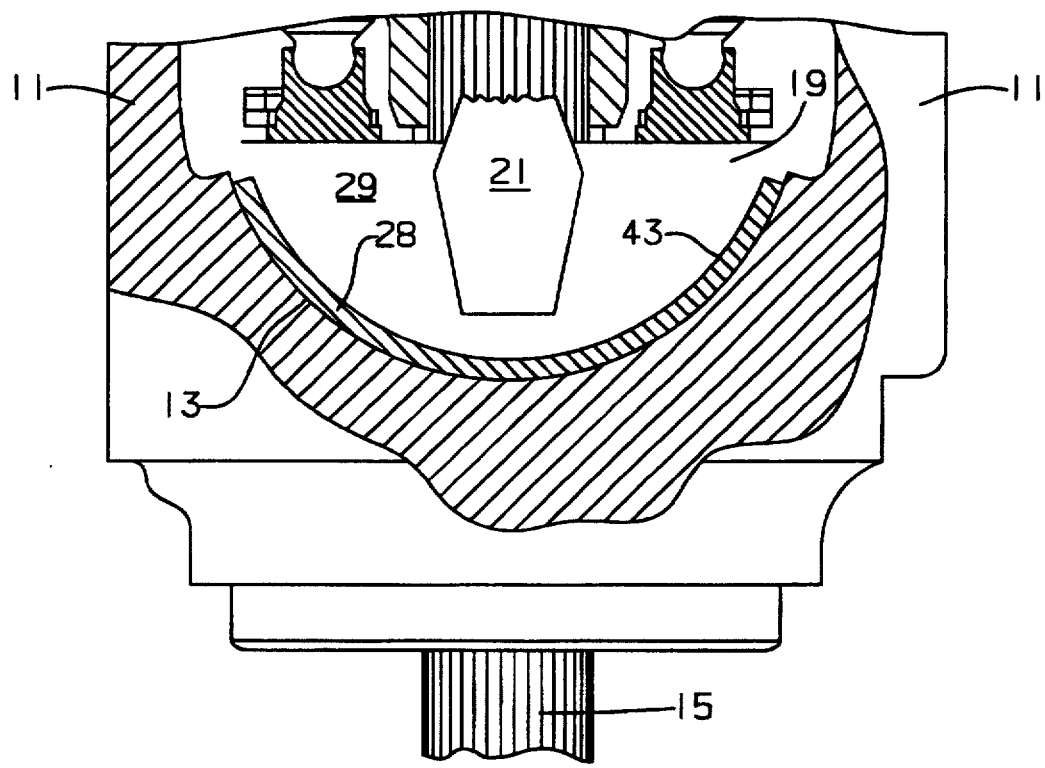

CRADLE BEARING ARRANGEMENT FOR AXIAL PISTON HYDRAULIC DEVICES

TECHNICAL FIELD

This invention relates generally to an axial piston hydraulic device and more particularly to the type of bearings supporting a tiltable swashplate of such device.

BACKGROUND ART

Axial piston variable displacement hydraulic devices utilize a tiltable swashplate to control the displacement of pistons within a rotating cylinder block. One common type of tiltable swashplate is a cradle type swashplate which is supported at one end of the housing by a pair of laterally spaced arcuate roller bearings disposed between a convex arcuate surface on the swashplate and a concave seating surface in the housing. Each of the pair of roller bearings has a plurality of rolling elements and a bearing race locating the individual rollers of the bearing. In order to assure that the arcuate rolling bearings do not slip to an adverse position during operation, some of the hydraulic devices have a timing or locating arrangement extending between the swashplate and the housing and being connected to the cage of the cradle bearing. Other hydraulic devices have the cradle type swashplates supported by a pair of laterally spaced, anti-friction sleeve bearings disposed between the swashplate and the housing. Generally, the roller bearings are commonly used in the devices subjected to high pressures while the sleeve type of bearings are used in low pressure devices.

The cost of the roller bearings are generally several times more than the cost of sleeve bearings and the use of roller bearings on both sides of the devices may unduly add to the total cost of the unit. For example, it has been found that the bearing at one side of the pump is generally highly loaded during operation while the bearing at the other side is generally lightly loaded. More specifically, if the hydraulic device is a pump, the bearing at the discharge or outlet side is highly loaded while the bearing at the inlet side is lightly loaded. If the hydraulic device is a motor, the bearing at the inlet side is highly loaded while the bearing at the outlet side is lightly loaded.

In view of the above, it would be desirable as a cost saving measure to utilize a bearing arrangement in which a more expensive roller bearing is used only on the normally highly loaded side of the hydraulic device, while a less expensive sleeve type bearing is used on the normally lightly loaded side of the device.

The present invention is directed to overcoming one or more of the problems as set forth above.

DISCLOSURE OF THE INVENTION

In one aspect of the present invention, an axial piston variable displacement hydraulic device has a housing defining laterally spaced first and second concave arcuate surfaces, a swashplate positioned in the housing and having opposite sides with one side being subjected to loads higher than loads imposed on the other side, the swashplate having a first convex arcuate surface disposed at the higher loaded side of the swashplate and a second convex arcuate surface disposed at the other side of the swashplate, an arcuate roller bearing assembly positioned between the first concave arcuate surface and the first convex arcuate surface, and an arcuate sleeve bearing positioned between the second concave arcuate surface and the second convex arcuate surface.

BRIEF DESCRIPTION OF THE DRAWINGS

FIG. 1 is a sectional view of a hydraulic device utilizing the present invention;

FIG. 2 is a partial sectional view taken generally along the line 2—2 of FIG. 1; and FIG. 3 is a partial sectional view taken generally along the line 3—3 of FIG. 1.

BEST MODE FOR CARRYING OUT THE INVENTION

An axial piston variable displacement hydraulic device 10 includes a multi-piece housing 11 having first and second laterally spaced concave arcuate surfaces 12,13. A rotatable barrel 14 is disposed within the housing and is secured to a shaft 13 for rotation about a central axis. The barrel has a plurality of cylinder bores 16 each of which sequentially communicate with a discharge port 17 and an inlet port 18 in the usual manner. A cradle swashplate 19 is positioned within the housing 11 at one end thereof and is adapted for tilting or pivotal movement induced by an input mechanism represented by a lever 21. The swashplate has a planer cam surface 22 engaged by a plurality of piston slippers 23 so that the tilting movement of the swashplate control the axial displacement of a plurality of reciprocating pistons disposed within the cylinder bores of the barrel.

The cradle swashplate 19 is mounted in the housing 11 by a roller bearing assembly 26 at one side 27 of the swashplate and an arcuate anti-friction, sleeve bearing 28 at another side 29 of the swashplate. The roller bearing assembly 26 is positioned between the concave arcuate surface 12 and a convex arcuate surface 31 formed on the swashplate 19. The roller bearing assembly includes an outer race 32 seated in the concave arcuate surface 12 a plurality of rollable elements such as rollers 33 and a bearing cage 34 to maintain arcuate spacing between the individual rollers 33. A follow up mechanism 36 is provided to assure that the arcuate roller bearings do not slip to an adverse position during operation. The follow up mechanism includes a flexural, elastic timing link 37 pivotally connected to the bearing cage 34 and having its opposite spherical ends slidably seated within bores 41,42 provided in the swashplate 19 and the housing 11.

The sleeve bearing 28 is positioned between the concave arcuate surface 13 and a convex arcuate surface 43 formed on the side 29 of the swashplate 19. The sleeve bearing may be constructed from any suitable anti-friction material such as bronze, plastic materials, etc.

Industrial Applicability

In use, the roller bearing assembly 26 and the sleeve bearing 28 support the swashplate 19 for pivotal movement relative to the housing 11 for changing the displacement of the hydraulic device 10 in the usual manner. The roller bearing assembly is at the side 27 of the swashplate positioned under the discharge port 17 and thereby is subjected to high forces generated by the high pressure fluid in the outlet port. Conversely, the sleeve bearing 28 is at the side 29 of the swashplate positioned under the inlet port 18 and, thus, is subjected to relatively low forces. By utilizing the more expensive roller bearing assembly under the side of the swashplate subjected to high forces and the sleeve bearing 28 on the side of the swashplate subjected to relatively low forces, the overall cost of the hydraulic device can be reduced without impairing the operation of the device.

Other aspects, objects and advantages of this invention can be obtained from a study of the drawings, the disclosure and the appended claims.

We claim:

1. An axial piston variable displacement hydraulic device comprising:

a housing defining laterally spaced first and second concave arcuate surfaces;

a swashplate positioned in the housing and having opposite sides with one side being subjected to loads higher than loads imposed on the other side, the swashplate having a first convex arcuate surface at the one side of the swashplate and a second convex arcuate surface at the other side of the swashplate;

an arcuate roller bearing assembly positioned between the first concave arcuate surface and the first convex arcuate surface; and an arcuate sleeve bearing positioned between the second concave arcuate surface and the second convex arcuate surface.

2. The axial piston variable displacement hydraulic device of claim 1 wherein the hydraulic device is a hydraulic pump and the housing includes a discharge port, the one side and the roller bearing assembly being positioned axially under the discharge port.

3. The axial piston variable displacement hydraulic device of claim 2 wherein the housing defines an inlet port, the other side of the swashplate and the sleeve bearing being positioned axially under the inlet port.

4. The axial piston variable displacement hydraulic device of claim 3 wherein the roller bearing assembly includes an outer race seated in the first concave arcuate surface and a plurality of rollers rollably engaging the first convex arcuate surface.

* * * * *